(12) United States Patent
Duffy

(10) Patent No.: US 10,035,333 B2
(45) Date of Patent: Jul. 31, 2018

(54) FIBRE REINFORCED COMPOSITE

(75) Inventor: Roger Philip Duffy, Preston (GB)

(73) Assignee: BAE Systems plc, London (GB)

( * ) Notice: Subject to any disclaimer, the term of this patent is extended or adjusted under 35 U.S.C. 154(b) by 484 days.

(21) Appl. No.: 13/130,165

(22) PCT Filed: Nov. 10, 2009

(86) PCT No.: PCT/GB2009/051503
§ 371 (c)(1),
(2), (4) Date: Jun. 10, 2011

(87) PCT Pub. No.: WO2010/058196
PCT Pub. Date: May 27, 2010

(65) Prior Publication Data
US 2011/0236620 A1 Sep. 29, 2011

(30) Foreign Application Priority Data

Nov. 19, 2008 (EP) .................... 08275075
Nov. 19, 2008 (GB) .................. 0821134.4

(51) Int. Cl.
*B32B 5/28* (2006.01)
*B32B 5/08* (2006.01)
(Continued)

(52) U.S. Cl.
CPC .............. *B32B 27/20* (2013.01); *B32B 5/022* (2013.01); *B32B 5/024* (2013.01); *B32B 5/026* (2013.01);
(Continued)

(58) Field of Classification Search
CPC B32B 5/02; B32B 5/022; B32B 5/024; B32B 5/026; B32B 5/10; B32B 5/12;
(Continued)

(56) References Cited

U.S. PATENT DOCUMENTS 2,368,706 A * 2/1945 Fountain ................ D04H 11/00
139/291 R
4,218,276 A * 8/1980 King ................... B29C 33/0033
156/148
(Continued)

FOREIGN PATENT DOCUMENTS

EP 0845346 A1 6/1998
GB 2066308 A 7/1981
(Continued)

OTHER PUBLICATIONS

Hosokote et al., Through-thickness Reinforcement of Laminar Composites, Journal of of Advanced Materials, vol. 36, No. 3, Jul. 2004.*
(Continued)

*Primary Examiner* — Camie S Thompson
(74) *Attorney, Agent, or Firm* — Maine Cernota & Rardin

(57) ABSTRACT

A secondary ply structure suitable for incorporation into a continuous fiber reinforced composite structure comprising a matrix material and a plurality of fiber ply reinforcing structures, a continuous fiber reinforced composite material so formed, and a method for the fabrication of the same are described. The secondary ply comprises a carrier sheet for example in the form of a ply of primary fibers and carries a two dimensional planar array of secondary fibers extending outwardly of the plane of the sheet into a third dimension in generally aligned manner and disposed across at least a major part of the surface thereof in generally aligned manner to provide out of plane reinforcement in the consolidated structure.

15 Claims, 3 Drawing Sheets

(51) Int. Cl.
*D03D 13/00* (2006.01)
*B29C 70/30* (2006.01)
*B32B 27/20* (2006.01)
*B32B 5/02* (2006.01)
*B32B 5/12* (2006.01)
*B32B 5/26* (2006.01)
*B32B 7/12* (2006.01)
*B32B 27/08* (2006.01)
*B32B 27/12* (2006.01)

(52) U.S. Cl.
CPC .............. *B32B 5/12* (2013.01); *B32B 5/26* (2013.01); *B32B 7/12* (2013.01); *B32B 27/08* (2013.01); *B32B 27/12* (2013.01); *Y10T 428/23957* (2015.04); *Y10T 428/24132* (2015.01); *Y10T 428/249921* (2015.04)

(58) Field of Classification Search
CPC .... B32B 5/26; B32B 3/00; B32B 7/08; B32B 7/12; Y10T 428/24132; Y10T 442/348; Y10T 442/30; Y10T 442/3488; Y10T 442/3724; Y10T 442/3789; Y10T 442/682; Y10T 428/249923; D04H 3/115; D04H 3/002; D04H 3/004; D04H 3/105; D03D 13/00; F41H 5/0485; B29C 70/24; B29C 65/00
USPC ........ 428/85, 86, 90, 95, 102, 223; 442/269, 442/313, 366, 268, 270, 283; 28/103, 28/107; 156/92
See application file for complete search history.

(56) References Cited

U.S. PATENT DOCUMENTS

| | | | |
|---|---|---|---|
| 4,528,051 A * | 7/1985 | Heinze | B29C 70/24 156/324 |
| 7,631,405 B2 * | 12/2009 | Ritter | B32B 5/26 28/103 |
| 2003/0008584 A1 * | 1/2003 | Thomas | B32B 5/26 442/240 |
| 2008/0274326 A1 * | 11/2008 | Kim et al. | 428/90 |
| 2012/0177870 A1 * | 7/2012 | Lyle | F41H 5/0414 428/113 |

FOREIGN PATENT DOCUMENTS

| | | |
|---|---|---|
| JP | 08 103960 A | 4/1996 |
| WO | 99/19137 A | 4/1999 |
| WO | 2008115301 A2 | 9/2008 |

OTHER PUBLICATIONS

International Search Report in related application No. PCT/GB2009/051503 dated Feb. 11, 2010.
International Preliminary Report on Patentability in related application No. PCT/GB2009/051503 dated Jun. 2, 2011.
European Search Report in related Application No. EP 08 27 5075 completed Mar. 9, 2009.
British Search Report in related Application No. GB0821134.4 dated Mar. 19, 2009.
Database WPI Week 199626, Thomas Scientific, London, GB; AN1996-024492 XP002518338, 1996.

* cited by examiner

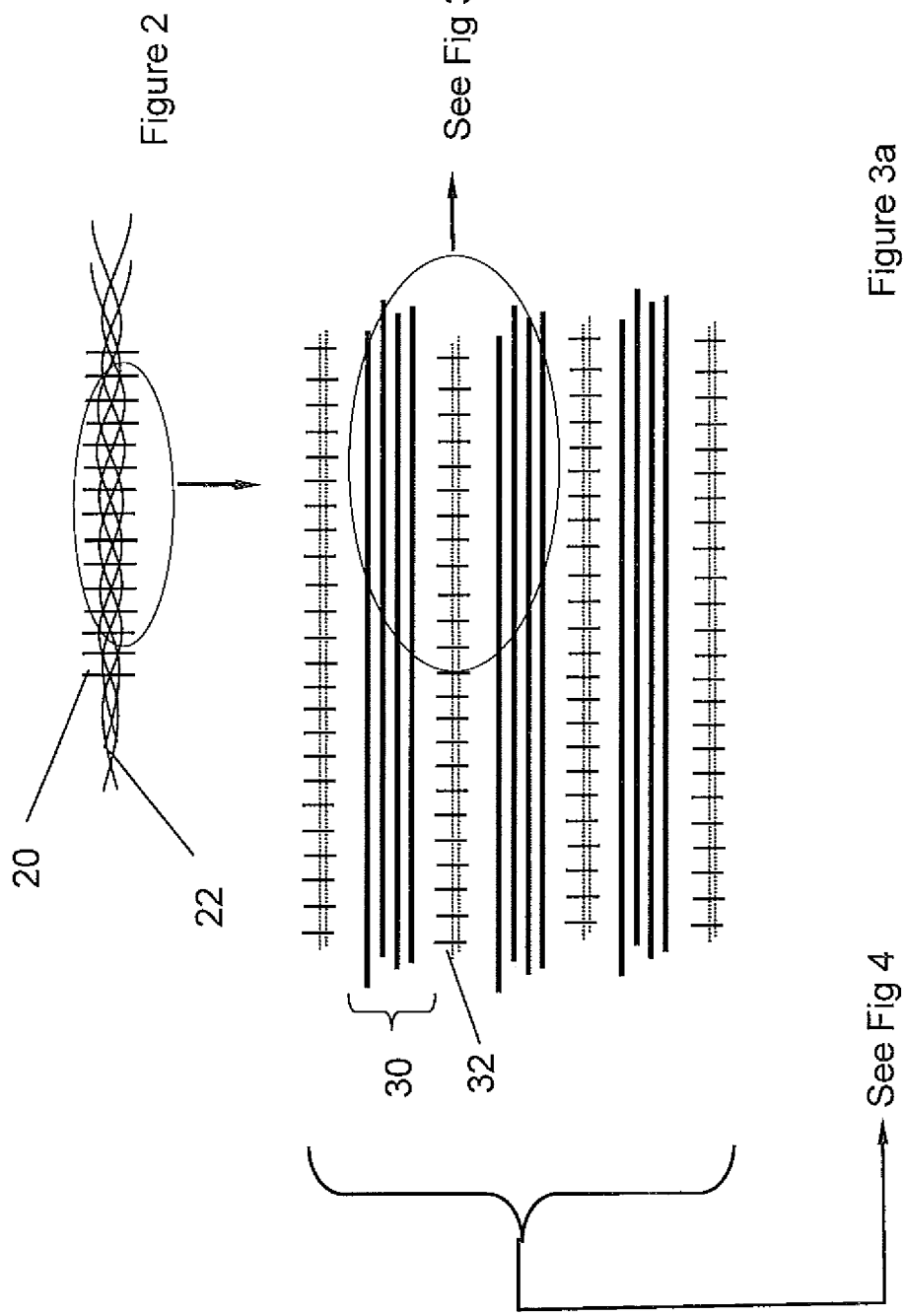

FIBRE REINFORCED COMPOSITE

CROSS REFERENCE TO RELATED APPLICATIONS

This is the U.S. National Phase of PCT/GB2009/051503, filed Nov. 10, 2009, which claims priority to British Patent Application No. 0821134.4, filed Nov. 19, 2008 and European Patent Application No. 08275075.3 filed Nov. 19, 2008 each of which are incorporated by reference herein in their entireties.

FIELD OF THE INVENTION

The invention relates to a composite material comprising a plurality of plies of hollow and/or solid fibre material combined with a suitable matrix material into a composite body, and to a method of fabrication of the same.

BACKGROUND OF THE INVENTION

Composite material systems which combine two or more distinct component materials are of increasing importance to meet demands for materials possessing an array of desirable properties. Typical composite materials comprise a reinforcing material disposed in a matrix material to create a new material which combines the desirable properties of the components and/or has properties that may not be present, or present to the same extent, in the components alone.

A significant class of composite material comprises a material with plural two-dimensional plies of fibrous reinforcing material disposed in a suitable matrix material. The plies of fibrous reinforcing material effect reinforcement in one or two dimensions, for example in that they comprise long fibres which usually substantially span the length and/or breadth of the ply, and hence of the composite material. Suitable plies for such purposes include unidirectional tapes with parallel fibres and bidirectional sheets in which fibres are arrayed in plural directions, and may be non-woven sheets or have a woven, braided stitched or other like structure. Composite materials reinforced with relatively long fibres in this manner are usually referred to as continuous fibre reinforced composites (CFRCs) to distinguish them from short fibre reinforced.

An acknowledged inherent weakness of CFRCs reinforced with plural laminar plies of fibrous reinforcing material is interlaminar or out of plane weakness. The fibre reinforcement may bear most of the load in the plane of the fibres. As CFRCs lack fibre reinforcement out of this plane, they possess a lesser load bearing capability in this direction. As a result, CFRCs tend to exhibit relatively lower interlaminar strength and/or fracture toughness, and interlaminar failure, for example by delamination, may occur at undesirably low levels of applied stress.

To mitigate this, solutions have been offered that tie the plies together in some mechanical manner in the third dimension, for example by braiding or stitching plies together to give additional through thickness strength. Such solutions have met limited success. In particular, they can reduce in plane strength by affecting the integrity of the in plane fibre structure. Moreover, if the third dimension braiding or stitching is to be effective this tends to require the reinforcement plies themselves to have a woven or similarly integrated two dimensional architecture, whereas for many applications it might otherwise be desirable to use non-woven sheet materials or unidirectional tape.

Provision of an enhanced material structure and method of fabrication providing for reinforcement in a third, out of plane dimension in CRFCs, and in particular a structure and method that limits any detrimental effect on in plane reinforcement and/or that is applicable to reinforcement plies with a variety of fibre structures, for example including non-woven sheets and unidirectional tape as well as woven structures, is therefore desirable.

SUMMARY OF THE INVENTION

In accordance with the present invention in a first aspect there is provided a composite structure comprising:
 a matrix material; and
 a plurality of fibre plies disposed substantially within the matrix material in generally parallel spaced manner; and
 at least one secondary ply comprising a fibre ply carrier sheet comprising a two dimensional ply of primary fibres and a two dimensional planar array of secondary fibres extending outwardly of the plane of the sheet into a third dimension in generally aligned manner and disposed across at least a major part of the surface thereof, wherein the secondary fibres project outwardly from both sides of the secondary ply.

Thus, in accordance with the invention, at least one, and preferably a plurality of, secondary plies are disposed on or in the assembled composite structure within the matrix material to act as carrier plies for a secondary reinforcement which is carried in the form of a plurality of secondary reinforcing fibres arrayed across a major part of the extent of the carrier ply, especially preferably in a generally evenly distributed array. The secondary fibres extend generally outwardly of the plane of the carrier ply. Particularly preferably, the fibres project outwardly such that at least a substantial proportion of them extend generally perpendicularly to the carrier ply in aligned manner. These provide reinforcement out of the principal reinforced plane direction of the CFRC.

The carrier ply may in principle be any suitable sheet material, for example comprising a fibre ply or a polymeric sheet. A fibre ply may also serve as a primary in plane reinforcement. A polymeric sheet may comprise a layer of curable adhesive. The carrier sheet is itself a fibre ply, and preferably a fibre ply suitable for incorporation into a continuous fibre reinforced composite structure to provide a reinforcement in a direction parallel to the plane of the ply. In this embodiment at least some of the said fibre plies additionally comprise carrier plies provided with a two dimensional plural array of secondary fibres extending outwardly of the plane of the ply and disposed across at least a major part of the surface thereof.

The secondary fibres extend out of the plane of the carrier ply, and for example into the matrix in a process laminate, to effect reinforcement in the third direction out of, and for example generally perpendicular to, the plane direction of the reinforcing plies. The secondary fibres are generally aligned. However, as will be appreciated from the reinforcement principles of the invention described herein, some misalignment will be tolerated.

In accordance with the principles of the invention, the secondary fibres are distributed across a major part of a carrier ply, in particular generally evenly. Thus, a ply carrying such secondary fibre reinforcement provides a generally uniform out of plane reinforcing function across at least a major part of its area extent and confers a reinforcing effect out of the plane of the area extent in conjunction with the matrix material, in a substantially uniform manner across the major extent of the ply. This can be contrasted with arrangements where discrete areas of secondary reinforcing fibres are provided which are designed to interact with corresponding but differently formed discrete areas of an adjacent ply, for example to effect a hook and loop type engagement, and which as a result need specific and careful alignment of interacting adjacent plies so that complementary discreet areas or structures interact in the required way. In a structure making use of carrier plies in accordance with the present invention there is no need for such complex alignment between plies.

Typically, some of such carrier plies will be interleaved in a process laminate structure with layers of conventional reinforcing plies. When such carrier plies are incorporated into a composite structure as additional reinforcement in this manner, the secondary reinforcement provided by the secondary fibres is consolidated into the laminate to improve out of plane properties, and in particular to give resistance to interlaminar stresses and reduce tendency to failure by delamination.

Additionally or alternatively, especially for example in the case where a carrier ply is a sheet of curable polymer adhesive, a ply may be applied at a joint between consolidated laminates, and/or at a joint surface region during a co-bonding process.

In all such cases, the out of plane alignment of secondary fibres provided in the carrier ply complements the in plane reinforcement of the primarily reinforcing fibre plies arranged in the matrix to give additional out of plane strength, for example for areas of high delamination stress.

Secondary fibres project outwardly from both sides of a secondary ply. Particularly preferably, a secondary fibre extends through a secondary ply to so project outwardly from both sides thereof.

Preferably, a secondary fibre is infiltrated into, and for example through, the secondary carrier ply in such manner as to be retained therein, subsequently to the formation of and without forming a directly constituent part of the two dimensional secondary ply structure. This is particularly advantageous where the secondary ply is a fibre carrier ply, and the secondary fibres project through the two dimensional structure of primary fibres making up the fibre carrier ply, without being woven, stitched, tied or otherwise incorporated into, by means of modification of, the underlying structure of the primary fibres making up the fibre carrier ply. For example, the secondary fibres project into and preferably through gaps within the one or two dimensional fibre structure created by and between the primary fibres of the carrier ply and thus do not require specific modification to the structure of the primary fibres of the carrier ply.

This confers two advantages in particular. First, the principles of the invention can be employed in principle with a range of primary fibre structures, for example including bidirectional sheets having a woven, braided, stitched or non-woven structure, and unidirectional tapes. Second, since the secondary fibres are provided by infiltration in such manner that the structure of the primary fibres of the carrier ply is left essentially unmodified, the reinforcing effect in-plane of the primary fibres need not be reduced, as might be the case for example in known systems where plies of primary fibres are connected together by stitching or like means to provide out of plane properties.

Preferably, in an assembled structure comprising a plurality of secondary plies disposed substantially within a matrix material, at least some adjacent plies have secondary fibres projecting from respective opposing surfaces of each ply into the matrix material between them, and especially projecting into the matrix material to such an extent as to partly enmesh. This partial enmeshing of secondary fibres from adjacent carrier plies enhances the reinforcing effect. The complementary structures are arrayed across a major part of the opposed carrier ply surfaces, preferably generally evenly, to give a simple, uniform reinforcing effect that does not require particular alignment of the layers.

In a typical composite material structure, secondary plies carrying secondary fibres in the manner above described are interleaved in laminar manner with a plurality of conventional reinforcing fibre plies. For example, secondary plies carrying secondary fibres in the manner above described may be provided, or provided in greater proportion, in laminate structures at areas of high interlaminar stress where it is desirable to improve out of plane properties, such as a T joint between a base plate and a spar, which are known to be areas particularly prone to delamination and similar failure modes. Additionally or alternatively secondary plies carrying secondary fibres in the manner above described may provided as part of the joint interface between such laminate structures.

Preferably, the secondary fibres comprise short length fibres, which term will be understood by the skilled person as contrasting with the "continuous" fibres of the conventional reinforcing plies making up the basic CFRC structure. For example, the secondary fibres may have a mean length of between 0.25 mm and 3 mm, and more preferably between 1 mm and 1.5 mm.

The secondary fibres preferably have a mean diameter and more preferably a maximum diameter of 30 µm or less to minimise the effect on the primary fibre structure of the carrier ply when infiltrated therein. Considerations of fibre handling during fabrication might make it desirable that the secondary fibres have a mean diameter and more preferably a minimum diameter of no less than 6 µm. Fibre diameters in the range of 10 to 20 µm are particularly preferred.

In a preferred embodiment the secondary plies are fibre carrier plies. The secondary fibres are preferably sized to be introduced to infiltrate the primary fibre structure of the fibre carrier ply, and in particular to pass through this primary fibre structure and to be retained therein in an arrangement which is generally aligned in the third dimension.

Secondary fibres may be hollow or solid fibres, fabricated from any suitable material, in particular which lends itself to the provision of short strand aligned fibres. Suitable materials might include carbon fibres, for example PAN based or pitch based, glass or ceramic fibres such as silica etc.

Carrier plies carrying secondary fibre enforcement in accordance with the invention are conveniently introduced into a laminar structure at the laminating or assembly stage and are typically intercalated with conventional CFRC reinforcement plies. The carrier plies in accordance with the invention may comprise fibre plies which merely serve as scrim cloth carriers for the secondary reinforcement, or may themselves comprise CFRC reinforcement plies in conventional manner. Carrier plies in accordance with the invention carrying secondary fibres as described are introduced in particular, or introduced in greater proportion, in areas of high interlaminar stress where delamination failure is likely to be a problem, for example at interfaces, and in particular at interfaces of a T joint and/or its mating face(s) with another component, and also at surfaces.

Fibre plies according to the invention whether comprising primary reinforcement plies and/or secondary fibre carrier plies for secondary reinforcement may comprise primary fibres of any suitable composition and structure to give in plane reinforcement in conjunction with suitable matrix material and/or to support the secondary fibres. Composite materials comprising fibres such as carbon fibres, glass fibres and aramid fibres held in a variety of resin matrices are known for example.

For example, as will be familiar, the primary fibres making up a fibre ply layer may be unidirectional (fibres in a single orientation), the ply for example comprising unidirectional tape with parallel fibres, or multidirectional, for example including multidirectional such as bidirectional sheet in which fibres are arranged in plural directions, for example in woven, knitted, stitched, braided, non-crimp or non-woven sheet. A ply may comprise multiple overlain, connected or consolidated sheet layers. A ply may comprise plural fibre tows (groups of fibres which, in each ply, run parallel with each other). It is a particular advantage of the invention that any suitable ply may be used, and that this ply may be for example a conventional reinforcing ply such as might conventionally be used in a CFRC.

In a more complete embodiment of the present invention, a composite structure comprises a matrix material and;

a plurality of reinforcing fibre plies disposed substantially within the matrix material in generally parallel spaced manner; and, for example, at areas of high interlaminar stress within the structure;

at least one secondary ply comprising a fibre ply carrier sheet, a fibre ply carrier sheet comprising a two dimensional ply of primary fibres and having a two dimensional planar array of secondary fibres extending outwardly of the plane of the sheet into a third dimension in generally aligned manner and disposed across at least a major part of the surface thereof, wherein the secondary fibres project outwardly from both sides of the secondary ply. Such a secondary ply may as above described additionally comprises a primarily reinforcing fibre ply, or may be a bespoke carrier sheet of fibrous or other constituent material.

In a particularly preferred case, the structure is a joint between two fibre reinforced laminate formations, and secondary plies comprising plural secondary fibres are provided within one or both laminate formations and/or at a surface of such a formation at least in the vicinity of the joint. For example, the joint is a butt joint such as a T joint.

In accordance with a further aspect of the invention, a secondary ply structure is provided suitable for incorporation into a continuous fibre reinforced composite structure comprising a matrix material and a plurality of fibre ply reinforcing structures, the secondary ply comprising a fibre ply carrier sheet comprising a two dimensional ply of primary fibres and a two dimensional planar array of secondary fibres extending outwardly of the plane of the sheet into a third dimension in generally aligned manner and disposed across at least a major part of the surface thereof, wherein the secondary fibres project outwardly from both sides of the secondary ply.

A fibre ply carrier sheet in accordance with this aspect of the invention may comprise primary fibres that are unidirectional, the ply for example comprising unidirectional tape with parallel fibres, or multidirectional, the ply for example comprising multidirectional such as bidirectional sheet in which fibres are arranged in plural directions, for example comprising woven, knitted, stitched, braided, non-crimp or non-woven sheet. Preferred features of the primary and secondary fibres will be understood with reference to the foregoing discussion of the first aspect of the invention.

A fibre ply carrier sheet in accordance with this aspect of the invention may thus comprise a reinforcing ply of generally conventional design.

Additionally or alternatively a fibre ply carrier sheet may comprise a carrier scrim having as its primary purpose the support of the secondary fibre array to provide out of plane reinforcement when interleaved with primary fibre reinforcing plies of generally conventional design in an assembled composite structure. Such a carrier scrim might for example comprise very light weight woven or knitted materials in which the secondary fibres are carried and for example into which the secondary fibres are infiltrated.

Additionally or alternatively a fibre ply carrier sheet may comprise a polymer sheet material which can be incorporated into or onto the surface of a matrix comprising laminar primary fibre reinforcing plies of generally conventional design to provide out of plane reinforcement in an assembled composite structure. For example a polymer sheet material may comprise a film adhesive, for example comprising a layer of cast or rolled out curable resin film of a desired weight, having a plural array of secondary fibres extending outwardly of the plane of the film, into a third dimension in generally aligned manner and disposed across at least a major part of the surface thereof. The film adhesive may be combined with a fibre carrier layer in familiar manner, for example carried on a light weight woven or knitted fibre layer to allow handling of the film and to create gauged thickness in an assembled joint (i.e. when bonded together the two parts with a carrier in the adhesive will have a glueline thickness defined by the carrier which may for example be gauged at between 0.125 and 0.250 mm).

Plural secondary ply structures in accordance with any or all of these alternatives may be incorporated into a laminate and/or at a joint interface of a CFRC having plural layers of primary fibre ply reinforcement to give secondary reinforcement out of the plane of the primary plies in accordance with the first aspect of the invention.

In accordance with a further aspect of the invention, a method of preparing a secondary reinforcing ply for use in a CFRC comprises the steps of:

providing a carrier layer of sheet material and preferably a fibre ply of primary fibre material;

introducing to and preferably through the carrier layer, for example in the case where the carrier layer is a fibre ply, by infiltrating into the gaps between the primary fibres, a plural array of secondary fibres extending outwardly of the plane of the carrier layer and disposed across at least a major part of the surface thereof, so that the secondary fibres project outwardly from both sides of the secondary ply.

The method is thus a method of preparing a reinforcing carrier ply in accordance with the second aspect of the invention set out hereinabove, and preferred features of the method will be appreciated by analogy.

The secondary fibres are in particular generally aligned and in a generally evenly spaced array. The process of producing a generally aligned structure of fibres is not necessarily pertinent to the invention. However, spray alignment processes have been found particularly effective at infiltrating fibres into a carrier layer in a manner that preserves a reasonable degree of alignment into the third dimension.

In a more complete aspect of the method, comprising a method of preparing a composite material in accordance with the first aspect of the invention, the method comprises the steps of:

preparing a plurality of secondary carrier plies in the manner above described:

optionally, preparing a plurality of primary reinforcing fibre plies comprising two dimensional primary fibre ply structures without such secondary fibres;

laying up a plurality of the plies (that is, of secondary carrier plies and primary reinforcing fibre plies in appropriate combination for desired final properties) in generally parallel spaced manner in conjunction with a suitable precursor of a matrix material, and for example a curable matrix material and;

processing the same for example by curing the matrix material to form a fibre reinforced composite material.

The matrix material and the forming process may be any conventionally known material and process. For example, the method may comprise laying up a plurality of prepreg plies in the manner above described in conjunction with interleaved film adhesive. Alternatively, the method may comprise using a cast adhesive. The adhesive is cured in suitable known manner, for example via a resin bonding process, to produce a composite material in accordance with the first aspect of the invention.

More completely, the method may be a method of fabricating a composite structure having areas of high stress/high delamination tendency, and comprises the provision of carrier plies having secondary reinforcement in the manner above described at such areas of high interlaminar stress/delamination tendency. The carrier plies are in particular preferably applied as a secondary material, for example as part of the structural assembly stage of a laminate, or at the joint assembly stage.

BRIEF DESCRIPTION OF THE DRAWINGS

The invention will now be described with reference to FIGS. 1 to 4 of the accompanying drawings, which illustrate the principles and embodiments of the invention by way of example only, in which:

FIG. 2 is a section through a carrier ply with secondary reinforcing fibres in accordance with an embodiment of the invention;

DETAILED DESCRIPTION

Figure 1:
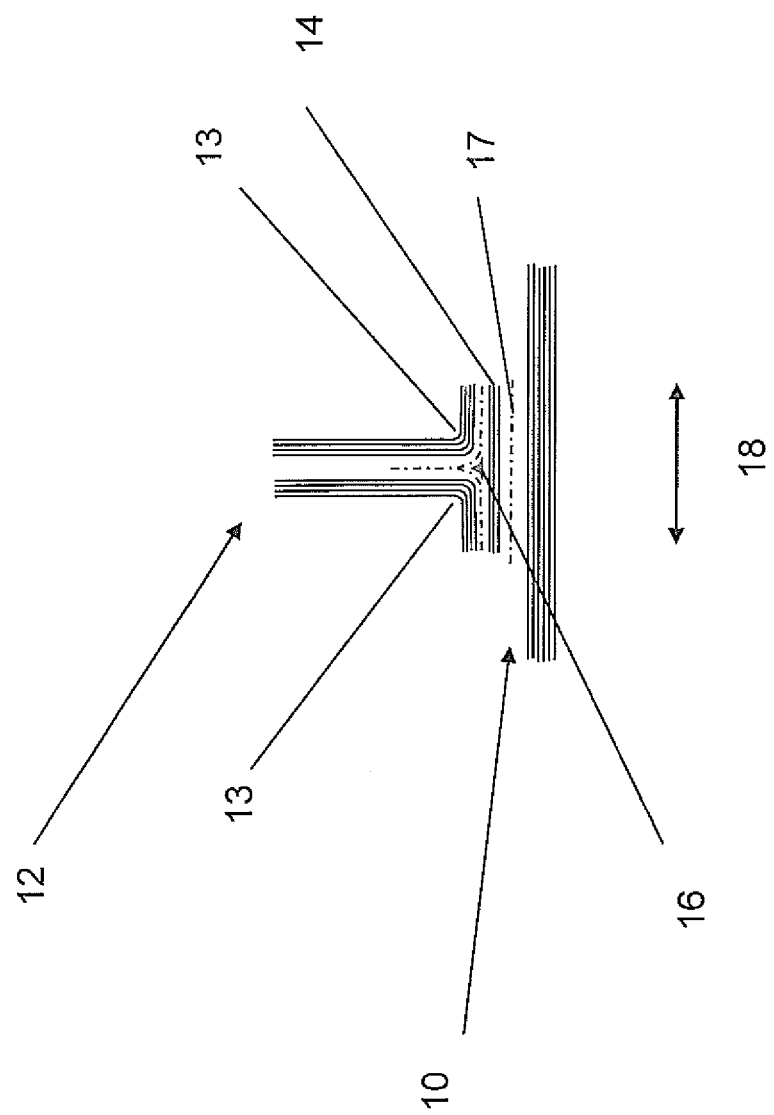
FIG. 1 is a schematic representation of a section through a T joint between two laminar CFRC structures, modified to embody the principles of the invention.

FIG. 1 is a schematic illustration of a joint between two carbon fibre reinforced laminar formations, such as might for example comprise a spar joint in an aerospace structure. The illustrated joint comprises the join between a spar 12 and a skin 10. To allow the spar 12 to be joined to the skin component 10 a relatively large footprint area 18 is required to provide a suitable interface surface to achieve a satisfactory bond with the skin. To form the footprint area 18, the spar is provided with a laminar foot formation 14 and laminar transition formation 13 on each side of the spar upright that curves progressively outwardly until the laminar reinforcements in each formation 13 extend approximately parallel to those of the foot 14.

Voids are created in the structure. In the prior art these are infilled, for example with curable resin and/or additional fibre reinforcement which in prior art known joint systems may be stitched, stapled or otherwise mechanically engaged with the spar 12 and/or skin 10 to prevent through-thickness splits. Such secondary mechanical reinforcement adds complexity to the joint fabrication process, and does not necessarily eliminate the problem posed by high delamination stresses occurring in particular parts of the joint. The areas 16 are particularly susceptible areas in this regard. The relatively limited reinforcement provided out of plane in the third dimension in conventional CRFCs, leading to fracture by delamination and associated mechanisms, can be a particular problem in these areas.

Consequently, carrier plies in accordance with the invention carrying secondary fibres (see FIGS. 2 to 4) are introduced, or introduced in greater proportion, in such areas of high stress where delamination is likely to be a problem. For example, a 6 mm to 7 mm sheet might include 60 to 70 laminar layers of fibre plies in matrix material. It might be appropriate to incorporate plies in accordance with the invention in the top 10 layers of such a structure.

Thus, in FIG. 1, carrier plies in accordance with the invention carrying secondary fibres are introduced in layers 16 within the joint structure. They may also be introduced at the interface 17. Additionally or alternatively, adhesive may be used at the interface 17. The carrier ply material could also be interleaved if necessary into the skin and/or detail parts of this or similar joint configurations.

FIG. 2 illustrates a section through a reinforcing fibre ply comprising an embodiment of carrier ply in accordance with the invention and suitable for incorporation into a composite structure such as that illustrated in FIG. 1 which comprises a matrix material, for example of a curable resin composition, and plural plies of fibre reinforcement to form a continuous fibre reinforced composite material. A carrier ply as illustrated in FIG. 2 is suitable for use in such a material such that on completion of processing it is incorporated into the processed laminate or joint interface in which the fibre ply of FIG. 2 contributes reinforcement out of the plane of the ply into a third dimension.

The carrier ply illustrated in FIG. 2 comprises a fibre layer carrier material 22. In the illustrated, embodiment the carrier material is a carrier scrim of lightweight fibre material having as its primary purpose the provision of a support structure that supports the secondary fibres in the desired generally aligned vertical manner. Alternative carrier materials, such as materials which are additionally full in plane reinforcement layers, or layers which are film adhesive layers, optionally with an associated fibre support layer, can be envisaged.

Through the fibre layer of the carrier ply, secondary fibres in plural array are infiltrated in generally aligned manner so as to extend generally perpendicularly to the sheet 22 across a major part of its extent in generally evenly spaced manner. These may be infiltrated for example by a spray process. Spray technology is capable of producing a suitable aligned fibre disposition. Other processes capable of producing a similar generally aligned fibre disposition might be considered.

FIG. 3 illustrates in cross section how a material as illustrated in FIG. 2 might be incorporated into a CFRC laminate structure, for example at the fabrication stage, in order to provide an out of plane reinforcement, for example at a joint interface such as that illustrated in FIG. 1.

Figure 3B:
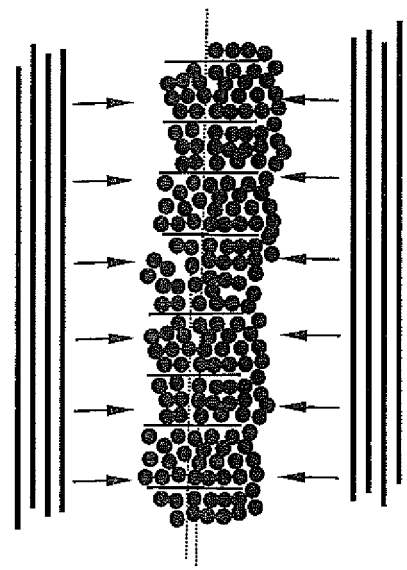
FIG. 3 illustrates a laid up laminar structure prior to consolidation incorporating layers illustrated in FIG. 2 to provide out of plane reinforcement, shown in general view in FIG. 3a, and with an inset of the out of plane reinforcement in FIG. 3b.

A structure is laid up comprising multiple layers of partial ply lamination 30 of conventional CFRC fibre ply/matrix material, for example comprising a plurality of prepreg plies of fibre composite material and curable film matrix material. Interleaved with these, at least in a zone to be reinforced, are provided a plurality of reinforcing plies 32 carrying secondary reinforcing fibres out of the general plane of the laminate in the manner illustrated in FIG. 3a. Specific detail of this is illustrated in the inset of FIG. 3b.

As this material is processed in a suitable conventional manner, for example by curing the matrix material, the secondary reinforcement is consolidated into the processed laminate to improve out of plane properties by projecting into the interlaminar matrix material.

Figure 4:
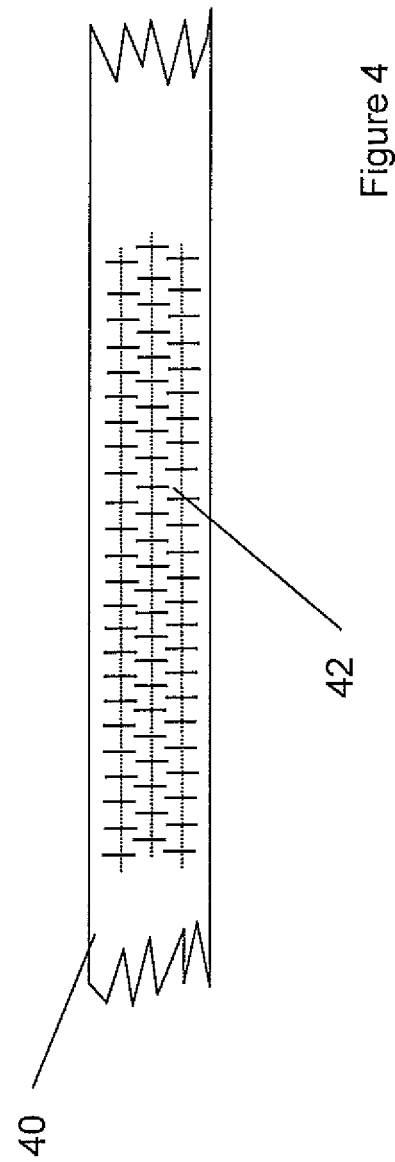
FIG. 4 illustrates in section a consolidated processed laminate structure derived from FIG. 3.

The resultant processed laminate structure is illustrated schematically in FIG. 4. The structure of FIG. 4 might in particular for example be suitable for use at areas of high delamination stress at a joint interface such as is illustrated in FIG. 1.

What is claimed is:

1. A ply structure for incorporation into a continuous fibre reinforced composite structure comprising:
    a matrix material; and
    a plurality of fibre ply reinforcing structures,
    each of the fibre ply reinforcing structures individually comprising a fibre ply carrier sheet;
        the fiber ply carrier sheet comprising a two dimensional ply of primary fibres;
        the two dimensional ply of primary fibres is a two dimensional planar sheet;
        the primary fibres are continuous with lengths only along the plane of the two dimensional planar sheet;
    each of the individual fibre ply carrier sheets is a support structure for support of its own secondary fibres;
    the fibre ply carrier sheet primary fibres are not initially bound in a matrix material so as to receive the secondary fibres;
    the fibre ply carrier sheet primary fibres comprise gaps into which the secondary fibres infiltrate; and
    wherein the fiber ply carrier sheet has a two dimensional planar array of secondary short fibres extending outwardly of the plane of the fiber ply carrier sheet into a third dimension;
    the secondary short fibres being oriented in a generally aligned manner;
    the secondary short fibres being disposed across at least a major part of the surface of the fibre ply carrier sheet, and
    wherein ends of the secondary short fibres project outwardly from both sides of the fiber ply carrier sheet and terminate without passing through the fiber ply carrier sheet again; and
    wherein the secondary short fibres have a mean diameter of 30 μm or less.

2. A structure in accordance with claim 1, wherein the secondary short fibres are arrayed across a major part of the extent of the fiber ply carrier sheet in a generally evenly distributed array; and
    the primary fibres of the fiber ply carrier sheet are woven.

3. A structure in accordance with claim 1, wherein the secondary short fibres project outwardly such that at least a substantial proportion of them extend generally perpendicularly to the fiber ply carrier sheet in an aligned manner.

4. A structure in accordance with claim 1, wherein the secondary short fibres extend through the fiber ply carrier sheet to so project outwardly from both sides thereof, being infiltrated through the fiber ply carrier sheet so as to be retained therein in such manner that the structure of the primary fibres of the carrier sheet is unmodified.

5. A structure in accordance with claim 1, wherein the secondary short fibres comprise fibres having a mean length between 0.25 mm and 3 mm.

6. A structure in accordance with claim 1, wherein the secondary short fibres have a mean diameter of between 6 μm and 30 μm.

7. A composite structure comprising at least one ply structure in accordance with claim 1 and disposed substantially within a matrix material.

8. A composite structure in accordance with claim 7, further comprising a plurality of said ply structures disposed substantially within the matrix material, wherein at least some adjacent ply structures have their said secondary short fibres projecting towards each other into the matrix material between them to such an extent as partly to enmesh.

9. A composite structure in accordance with claim 7, further comprising a plurality of primary fibre ply reinforcing structures disposed substantially within the matrix material in generally parallel spaced manner, the previously mentioned primary fibre ply reinforcing structures being secondary ply structures.

10. A structure in accordance with claim 1, wherein the secondary short fibres protrude to each side to substantially the same degree.

11. A structure in accordance with claim 1, wherein the fibre ply carrier sheet is not resin-impregnated.

12. The ply structure for incorporation into a continuous fibre reinforced composite structure in accordance with claim 1, wherein the ply structure is interwoven with at least a top ten layers of the composite structure.

13. The ply structure for incorporation into a continuous fibre reinforced composite structure in accordance with claim 1, wherein the matrix material comprises a curable resin.

14. The ply structure for incorporation into a continuous fibre reinforced composite structure in accordance with claim 1, wherein the secondary fibres comprise carbon.

15. The ply structure for incorporation into a continuous fibre reinforced composite structure in accordance with claim 1, wherein the secondary fibres comprise at least one of glass or ceramic.

* * * * *